United States Patent
Dulaney et al.

[11] Patent Number: 5,911,891
[45] Date of Patent: Jun. 15, 1999

[54] LASER SHOCK PEENING WITH TAILORED MULTIPLE LASER BEAMS

[75] Inventors: Jeff L. Dulaney, Dublin; Allan H. Clauer, Worthington; David W. Sokol, Dublin, all of Ohio

[73] Assignee: LSP Technologies, Inc., Dublin, Ohio

[21] Appl. No.: 08/927,716

[22] Filed: Sep. 11, 1997

[51] Int. Cl.$^6$ ..................................................... B23K 26/00
[52] U.S. Cl. ...................................... 219/121.85; 148/525
[58] Field of Search ........................... 219/121.66, 121.85, 219/121.69, 121.65, 121.61, 121.62, 121.76, 121.77; 148/525; 372/108

[56] References Cited

U.S. PATENT DOCUMENTS

| | | | |
|---|---|---|---|
| 4,937,421 | 6/1990 | Ortiz et al. | 219/121.69 |
| 5,127,019 | 6/1992 | Epstein et al. | 372/108 |
| 5,131,957 | 7/1992 | Epstein et al. | 148/565 |
| 5,151,134 | 9/1992 | Boquillon et al. | 219/121.76 |
| 5,463,200 | 10/1995 | James et al. | 219/121.77 |
| 5,525,429 | 6/1996 | Mannava et al. | 148/525 |
| 5,531,570 | 7/1996 | Mannava et al. | 219/121.85 |
| 5,591,009 | 1/1997 | Mannava et al. | 148/525 |

FOREIGN PATENT DOCUMENTS

| | | |
|---|---|---|
| 731184 | 9/1996 | European Pat. Off. . |
| 95/25821 | 9/1995 | WIPO . |

OTHER PUBLICATIONS

Metadex 96(11): 31–3843 Abstract, Dec. 1995.
Metadex 81(10): 56–846 Abstract, Aug. 1980.
Metadex 80(4): 56–305, Feb. 1979.

*Primary Examiner*—Geoffrey S. Evans
*Attorney, Agent, or Firm*—Randall J. Knuth

[57] ABSTRACT

Method of changing the residual compressive stresses of an area of a workpiece by tailoring multiple laser beams applied to the workpiece. In one embodiment, a relatively long duration laser pulse is applied to the workpiece followed by a relatively short duration laser pulse. Other tailoring embodiments used to increase the total residual compressive stress of workpieces include blending two laser pulses, or splicing them utilizing a first short sliced-type beam combined with a relatively long duration, high powered gaussian laser beam pulse. A third embodiment utilizes two or more laser beams or pulses of different wavelengths.

22 Claims, 2 Drawing Sheets

LASER SHOCK PEENING WITH TAILORED MULTIPLE LASER BEAMS

BACKGROUND OF THE INVENTION

1. Field of the Invention

The present invention relates to the use of coherent energy pulses, as from high power pulsed lasers, in the shock processing of solid materials, and, more particularly, to the process of improving properties of such solid materials by providing shock waves therein by tailored multiple laser beam impacts to the solid material. The invention is especially useful for enhancing or creating desired physical properties such as hardness, strength, and fatigue strength.

2. Description of the Related Art

Known methods for the shock processing of solid materials, particularly known methods for the laser shock processing of solid materials, typically use coherent energy from a laser beam oriented normal to a workpiece.

Typical laser shock processing techniques and equipment can be found in U.S. Pat. No. 5,131,957 to Epstein.

Particular types of workpieces used with shock peening include such items as gas turbine engine blades, integrally bladed rotors, a.k.a Blisks, disks, turbine components, and other metallic or alloy materials. Some of these items need laser shock processing on opposite sides of the workpiece. In this type of situation, a process known as split beam processing is used in which a single laser beam is generated and split through various optics to generate two laser beams that impact opposite sides of the workpiece at approximately the same time.

It has been found that on some of these relatively thin sections, such as the blades of gas turbine engines, or other types of turbine blades, the use of relatively long duration, high-energy pulses used to create residual compressive stresses therein, do not create the residual compressive stresses to the level that would normally be expected in a typically thick specimen. With such relatively thin pieces, the shock wave from one side reflects from the other side with sufficient amplitude to alter the distribution of compressive residual stresses on the other side.

What is needed in the art is a method to eliminate or minimize such interaction problems with a relatively thin workpiece sections, and possibly also relatively thick sections.

SUMMARY OF THE INVENTION

The present invention provides a method for changing the residual compressive stresses of an area of a workpiece to significantly reduce the interaction problem during split beam processing.

Tailored laser beam characteristics of the present invention are used to modify and improve the material property effects and processing efficiency.

The concept, utilizes a combination of pulses. This achieves a better residual compressive stress profile by including more area underneath the residual compressive stress versus depth curve (as shown in FIG. 1). In one form of the invention, it may be true that superior properties may be utilized with using first a relatively long duration pulse, then a relatively short duration pulse.

In the preferred form of the invention, the method calls for changing the residual compressive stresses of an area of a workpiece by generating a first laser beam of relatively long duration and applying it to the area workpiece, and then generating a second laser beam of relatively short duration and applying it to the area of the workpiece.

As used in this application, the relatively long duration of the first laser pulse and a relatively short duration of the second laser pulse can be set to a particular time, or can be defined relative to the other. In one form of the invention the long duration of the first laser beam is approximately 20 nanoseconds long. In another form of the invention, the relatively short duration of the second laser pulse is approximately 6 nanoseconds long. In yet another form of the invention, benefits of changing the residual compressive stresses within a workpiece are found when the duration of the first laser pulse is about approximately three times the duration of the second laser pulse. Results may apply over a larger range than disclosed. One factor that varies the duration ratio is that of workpiece thickness.

In yet another form of the invention, the definition of long duration and relatively short duration laser pulse may be defined as either greater or shorter than a predetermined time. The inventors have determined through experimentation with titanium alloy that such predetermined time is approximately 15 nanoseconds, all other system conditions constant. The conditions include utilizing a Nd-glass laser having a beam with 50 joules of energy.

In the above examples of the invention, the particular laser beams are of approximately the same peak power density. The only difference between the laser beams are that they have different pulse lengths. Optimizing laser peening pulse widths (long and short) are dependent upon the workpiece material. The inventors have utilized a titanium test sample and found that the predetermined time for separating between a long duration and a relatively short duration is approximately 15 nanoseconds. Other materials and workpiece geometries may have different predetermined times.

Another embodiment of the present invention is when a longer pressure pulse (greater than 20 nanoseconds, but preferably longer than 30 nanoseconds) is desired, one constructs it by adding a short sliced laser pulse followed by a long gaussian pulse, possibly overlapping in time with the first laser pulse. This embodiment requires two separate laser beams, but in this case defeats dielectric breakdown effects caused by the normally slowly maximizing, long gaussian laser pulse beam. These tailored (spliced) laser beams also improve the residual compressive stress results. A laser pulse slicer is a device used to modify the leading edge of the laser pulse to have a rise time of approximately less then 5 nanoseconds.

A further embodiment of the present invention is to increase the energy coupling to the workpiece by forestalling dielectric breakdown, when initiating the plasma. Two laser beams are utilized in which the first creates a laser pulse that has a particular first wavelength, while the second creates a laser pulse that has a different wavelength. Excitation of the plasma is completed more efficiently using the laser pulses of these differing frequencies. Alternatively, multimode laser beams utilizing multi-harmonics, in different spatial profiles may also be equivalently utilized.

An advantage of the present invention is that an increase in residual compressive stress at the surface and throughout the workpiece is created for relatively thin section workpieces, such as gas turbine engine blades and other similarly type materials having a relatively thin cross section.

Another advantage of the present invention is that an increase in fatigue life of processed workpieces has been created beyond the fatigue life normally created through a conventional laser peening process.

Yet another advantage of the present invention is that the process creates workpieces having more resistance to crack initiation and propagation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

The improvements in fatigue life produced by laser shock processing are the results of residual compressive stresses developed in the irradiated surface that retard fatigue crack initiation and/or slow crack propagation. Changes in the shape of a crack front and slowing of the crack growth rate when the crack front encounters the laser shocked zone have been shown. Laser shock processing is an effective method of increasing fatigue life in metals by treating fatigue critical regions. For a more through background and the prior history of laser shock processing and that of high powered processing of engineered materials, reference can be made to U.S. Pat. No. 5,131,957. This patent shows the type of laser and laser circuit adaptable for use with the present invention. Another type of laser adaptable for use with the invention, is that with a Nd-Glass Laser manufactured by LSP Technologies, of Dublin, Ohio.

Use of transparent and opaque overlays is known with the standard laser shock processing or laser peening. Such descriptions of transparent and opaque laser peening overlays used with the process are not discussed here.

The present invention includes laser shock processing by tailoring the laser beam characteristics to improve the material property effects. A particular discovery of the present inventors is that an increase in residual compressive stress, particularly in relatively thin workpieces can be achieved by processing first with a relatively long duration laser pulse or beam and then with a second relatively short laser pulse or beam.

The particular invention counteracts an interaction problem found with the laser shock peening of relatively thin workpieces, such as turbine blades and other workpieces. Relatively thin workpieces are those where when peened on only one side, there is normally a change in shape or contour of the workpiece. The inventors, utilizing the new method of the present invention, have dramatically increased the fatigue strength and fatigue life of workpieces.

The invention of applying a first relatively long duration laser pulse to the workpiece and then a second relatively short duration laser pulse is not simply that of superposition (addition) of the different residual compressive stress profiles generated by each individual pulse. The inventors believe that the residual compressive stress responses of the relatively short and relatively long laser pulses will be combined together where such compressive stress profiles are not summed, but the combined profile substantially follows the maxima of the residual compressive stress response of each pulse.

Figure 1:
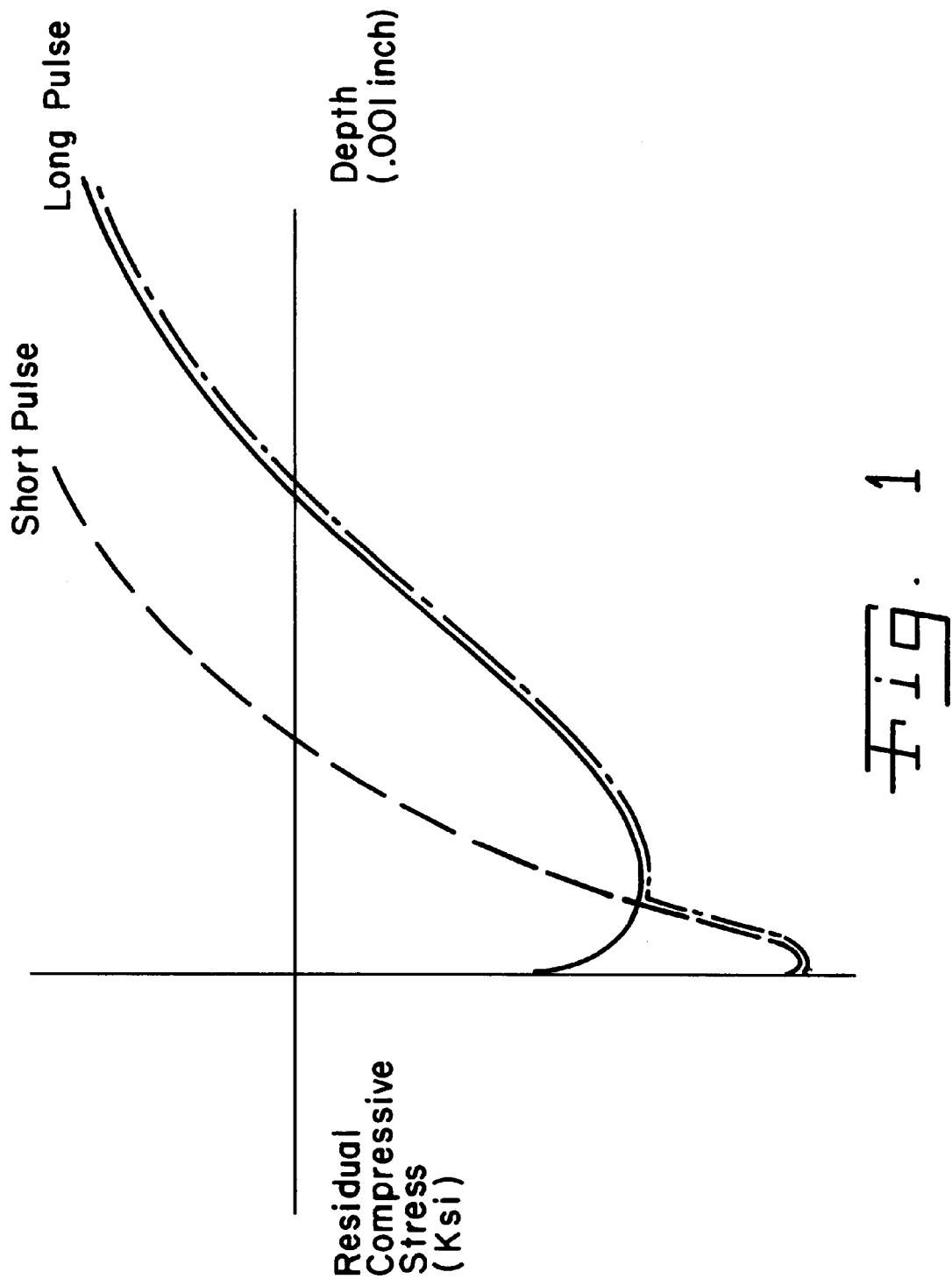
FIG. 1 is a graph of the results of the residual compressive stress compared to depth in a test workpiece processed by the method of the present invention.

As shown in FIG. 1, a residual compressive stress profile of a relatively short duration pulse laser beam is shown having the best effect regarding residual compressive stress near the top surface of the workpiece. The compressive stress profile of a relatively long duration laser pulse is shown in which the particular residual compressive stress profile at the surface is not maximized. The total residual compressive stress over the depth of the workpiece is greater for the relatively longer duration pulse as compared to the relatively shorter duration pulse. The dotted line shown in FIG. 1, shows the combination of a relatively long duration pulse laser beam residual compressive stress response along with the residual compressive stress response of a relatively short duration pulse when combined. No simple summation of the residual compressive stress profiles is shown on the data. If such results were shown, the dashed line showing the measured residual compressive stress response of the total system would be totally altered to that of a normal superposition (summation) of the two curves, which is not experimentally shown.

The data plot shown in FIG. 1 is that of a relatively thin workpiece utilized in a laser beam having an approximate effective energy of 50 joules. The laser beams utilized have the same peak power density with their only difference being that of a different pulse length. The short duration laser pulse was in the range of approximately 6 nanoseconds, while the duration of the long laser pulse laser beam was in the range of approximately 20 nanoseconds. The titanium test piece was approximately 0.035 inches (0.9 mm) thick.

In terms of the laser pulse duration utilized in the present invention, utilizing a particular peak power laser pulse, a particular thickness of the workpiece, and a particular material of the workpiece, such duration may change dependent upon the changing of any of these variables. Particularly, the thickness of the workpiece may significantly alter the optimum duration or pulse width.

In any event, the first and second laser pulses generate residual compressive stress responses in which the shape of the residual stress profile can be made different from that generated by multiple pulses of the same duration, and the total residual compressive stress is greater, i.e., having a greater total compressive residual stress than would be created by either of the two laser beams.

In production operation, the method may be used in an operating environment in which a workpiece is subjected to relatively long duration pulses at a plurality of different areas. Then, the workpiece may be subjected to subsequent processing with a plurality of relatively short duration of laser pulses of the previously worked areas. In other words, in processing a plurality of areas, they all may be processed with a relatively long duration laser beam first and then subsequently with a relatively short duration laser beam. Alternatively, each spot of the plurality in sequence could be processed with first the long duration laser beam, then a second short laser beam (i.e., the invention and laser peening system would process in the order long, short, long, short, etc.).

Figure 2:
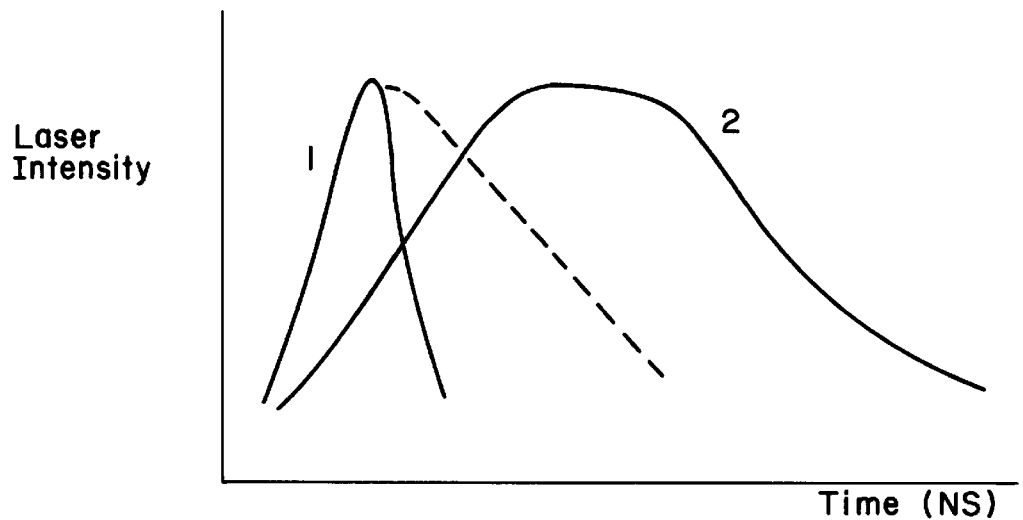
FIG. 2 is a graph showing an embodiment of the method with two laser pulses.

In another embodiment of the invention, material properties may also be altered by changing the laser pulse wave front characteristics. Another option to increase the total residual compressive stress formative of the workpiece is through the use of splicing two laser pulses together (FIG. 2). The inventors have found that by using the normal gaussian beam pulse, insufficient residual compressive stress may be formed near the workpiece surface. The inventors have found that increasing or accelerating the laser beam pulse rise time counteracts such reduced residual compressive stress profile near the workpiece surface.

Figure 3:
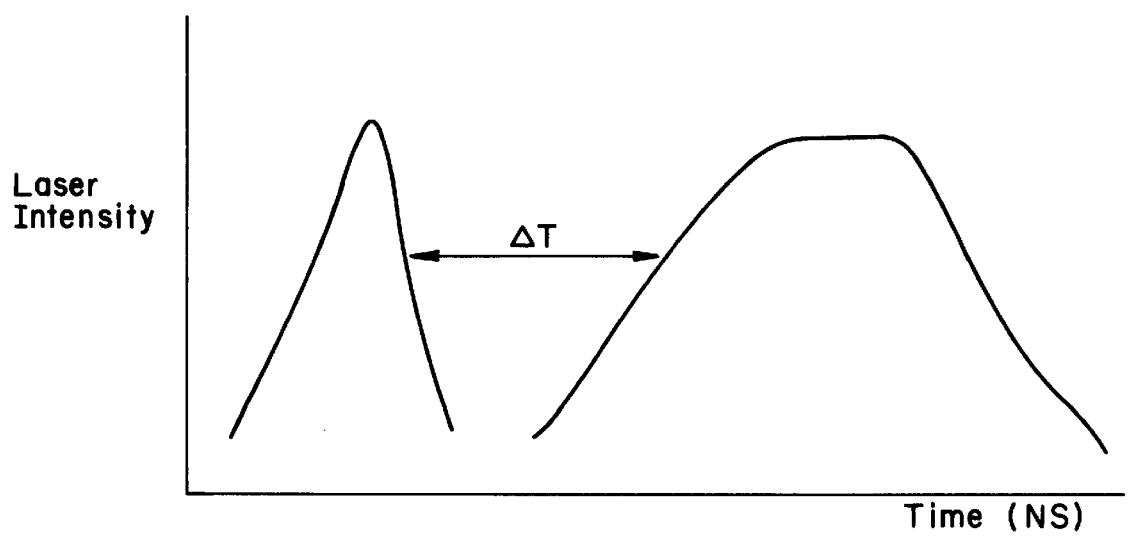
FIG. 3 is a graph showing an alternative embodiment of the method where two laser pulses are separated by a time (ΔT). This time would be less than the time needed for the plasma to quench.

In other words, a very sharp rise time is better for creating surface residual compressive stresses. Operational requirements of laser peening equipment, such as that of utilizing high powered gaussian pulses with a short initial or sharp rise time would create excessive stresses within the laser peening equipment. The invention in one aspect comprises utilizing two laser pulses, and preferably two separate lasers, to impact the same area on a workpiece. The first laser pulse having a relatively short duration, but having a very sharp initial wave front, i.e., sharp rise time, then followed and overlapped in time with the second laser beam with a long gaussian-type pulse, directed to the same area of the first pulse on the workpiece. An advantage of increasing the residual compressive stress with this embodiment is the sharp wave front and short duration of the first laser pulse defeats the effects of dielectric breakdown, such that the first laser beam's sharp rise time ignites the plasma spot created at the workpiece surface. The second (long duration) laser pulse pumps additional energy into the plasma previously created. Both of the above embodiments may be applied to opposite sides of the workpiece, such as conventionally done with split beam processing. Further, such pulses may overlap in time at the surface of the workpiece. In one form of the invention, the second pulse is applied before the plasma created by the first pulse has quenched (FIG. 3).

Another embodiment of the present invention is that of improving the material property effects by tailoring the laser beam characteristics such that the laser peening operation utilizes two separate laser beams or pulses having differing wavelengths, one to ignite and the other to pump energy into the plasma created. Such use of two laser beams or pulses having different wavelengths couples energy into the plasma more efficiently.

An example comprises generating a first laser beam having a wavelength of approximately 532 nanometers with a second laser beam having a wavelength of approximately 1054 nanometers. In an example of such use, a laser may be utilized that is lower in energy, but has a higher frequency, thereby a shorter wavelength, so that the ignition of the plasma occurs faster. Using a shorter wavelength to ignite the plasma also reduces the probability of dielectric breakdown of the transparent overlay. By reducing the amount of energy coupling into possible dielectric breakdown, a subsequent increase in the amount of energy that couples into the laser peening process plasma is possible.

Another benefit of using multiple wavelengths is that by using a shorter wavelength of coherent energy, there is less chance of the dielectric breakdown effect. Shorter wavelengths, such as may be generated by eximer lasers, make it harder to couple the energy into the transparent overlay material which could produce an electron avalanche (i.e., dielectric breakdown). In this case, it may be possible to reduce the use of sliced-type pulses as the shorter wavelengths will in effect operate as a sliced-type pulse. This would allow the removal of currently expensive pulse slicers within the laser system. Another advantage is that by eliminating the conventional pulse slicer, one eliminates the sharp sliced-type edge (laser pulse leading edge) that runs through the laser system. Such high amplitude wave fronts are deleterious to the laser rods and system. A reduction or elimination of such would thereby reduce laser maintenance costs.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A laser peening method for changing the residual compressive stresses of an area of a workpiece, the method comprising the steps of:

generating a first laser pulse of relatively long duration and applying it to a first area of the workpiece; and generating a second laser pulse of relatively short duration and applying it to a second area of the workpiece.

2. The laser peening method of claim 1 in which the duration of said first laser pulse is approximately twenty nanoseconds.

3. The laser peening method of claim 1 in which the duration of said second laser pulse is approximately six nanoseconds.

4. The laser peening method of claim 1 in which the duration of said first laser pulse is at least approximately two times the duration of said second laser pulse.

5. The laser peening method of claim 1 in which said first area and said second area are the same.

6. The laser peening method of claim 4 in which said workpiece is of relatively thin cross section.

7. The laser peening method of claim 6 in which said workpiece is a gas turbine engine blade.

8. The laser peening method of claim 6 in which said workpiece is an integrally bladed rotor.

9. The laser peening method of claim 1 in which the duration of said first laser pulse is at least approximately three times the duration of said second laser pulse.

10. The laser peening method of claim 9 in which said workpiece is of relatively thin cross section.

11. The laser peening method of claim 10 in which said workpiece is a gas turbine engine blade.

12. The laser peening method of claim 10 in which said workpiece is an integrally bladed rotor.

13. The laser peening method of claim 1 in which the generating steps are reversed.

14. The laser peening method of claim 1 in which said relatively long duration pulse is greater than a predetermined time and said relatively short duration pulse is less than said predetermined time.

15. The laser peening method of claim 14 in which said predetermined time is approximately fifteen nanoseconds.

16. The laser peening method of claim 15 in which said workpiece is formed of titanium alloy.

17. A laser peening method for changing the residual compressive stresses in a relatively thin section of a workpiece, the method comprising:

generating a first laser pulse of relatively long duration; and applying it to the thin section of the workpiece; and generating a second laser pulse of relatively short duration and applying it to the thin section of the workpiece.

18. The laser peening method of claim 17 in which the duration of said first laser pulse is approximately twenty nanoseconds.

19. The laser peening method of claim 17 in which the duration of said second laser pulse is approximately six nanoseconds.

20. The laser peening method of claim 17 in which the duration of said first laser pulse is at least approximately two times the duration of said second laser pulse.

21. A laser peening method comprising the steps of:

laser peening with a laser pulse which creates a first residual compressive stress response within a workpiece;

laser peening with a laser pulse which creates a second residual compressive stress response within the workpiece, said residual compressive stress responses combining within said workpiece creating a total compressive residual stress profile greater than either of said residual compressive stress responses; and said first laser peening step utilizes a relatively short sliced laser pulse and said second laser peening step utilizes an relatively long laser pulse.

22. A laser peening method comprising the steps of:

laser peening with a laser pulse which creates a first residual compressive stress response within a workpiece;

laser peening with a laser pulse which creates a second residual compressive stress response within the workpiece, said residual compressive stress responses combining within said workpiece creating a total compressive residual stress profile greater than either of said residual compressive stress responses; and said first laser peening step utilizes a laser pulse having a first wavelength and said second laser peening step utilizes a laser pulse having a wavelength different from said first wavelength.

* * * * *